(12) United States Patent
Schultheis

(10) Patent No.: US 9,169,076 B2
(45) Date of Patent: Oct. 27, 2015

(54) TREATMENT DEVICE FOR FREE-FLOWING BULK MATERIAL

(71) Applicant: Wilhelm Schultheis, Offenbach (DE)

(72) Inventor: Wilhelm Schultheis, Offenbach (DE)

(73) Assignee: VIBRA MASCHINENFABRIK SCHULTHEIS GmbH & Co., Offenbach (DE)

(*) Notice: Subject to any disclaimer, the term of this patent is extended or adjusted under 35 U.S.C. 154(b) by 35 days.

(21) Appl. No.: 13/952,685

(22) Filed: Jul. 29, 2013

(65) Prior Publication Data

US 2014/0041997 A1    Feb. 13, 2014

(30) Foreign Application Priority Data

Aug. 10, 2012 (DE) .......................... 10 2012 214 341

(51) Int. Cl.
| | |
|---|---|
| *B65G 27/08* | (2006.01) |
| *B07B 1/30* | (2006.01) |
| *B07B 1/40* | (2006.01) |
| *B07B 1/42* | (2006.01) |

(52) U.S. Cl.
CPC . *B65G 27/08* (2013.01); *B07B 1/30* (2013.01); *B07B 1/40* (2013.01); *B07B 1/42* (2013.01)

(58) Field of Classification Search
CPC ............ B65G 27/08; B07B 1/42; B07B 1/40; B07B 1/30
USPC ......................................................... 198/763
See application file for complete search history.

(56) References Cited

U.S. PATENT DOCUMENTS

| | | | | |
|---|---|---|---|---|
| 3,024,663 | A | * | 3/1962 | Carrier, Jr. et al. ................ 74/61 |
| 3,270,883 | A | * | 9/1966 | Teuteberg et al. ............ 209/329 |

(Continued)

FOREIGN PATENT DOCUMENTS

| | | |
|---|---|---|
| DE | 1023303 B | 1/1958 |
| DE | 3310187 A1 | 10/1984 |

(Continued)

OTHER PUBLICATIONS

International Search Report for International Application No. PCT/EP2013/066084, dated Nov. 26, 2013.

(Continued)

*Primary Examiner* — Gene Crawford
*Assistant Examiner* — Thomas Randazzo
(74) *Attorney, Agent, or Firm* — Manfred Beck, P.A.

(57) ABSTRACT

A treatment device for free-flowing bulk material includes a bulk material carrier with an inclined treatment area, a counter-vibration mechanism, which extends longitudinally under the bulk material carrier and runs horizontally or likewise in an inclined manner, a cable suspension for suspending the counter-vibration mechanism, supports for supporting the bulk material carrier in the vertical direction on the counter-vibration mechanism, a spring assembly with several springs connecting the bulk material carrier and the counter-vibration mechanism and providing an elastic support perpendicular to the vertical direction both in the longitudinal direction and in the transverse direction of the counter-vibration mechanism, and a vibration exciter for exciting the treatment area in the longitudinal and transverse direction of the counter-vibration mechanism. The treatment device is distinguished by a small constructional outlay and low maintenance requirements. Moreover, the risk of a contamination of the bulk material and the environment with lubricant is small.

11 Claims, 4 Drawing Sheets

(56) References Cited

U.S. PATENT DOCUMENTS

| | | | |
|---|---|---|---|
| 3,417,630 A * | 12/1968 | Bruderlein | 74/61 |
| 4,040,303 A * | 8/1977 | Makino | 74/61 |
| 4,162,778 A * | 7/1979 | Kraft | 248/610 |
| 4,260,051 A * | 4/1981 | Burghart | 198/760 |
| 5,131,525 A * | 7/1992 | Musschoot | 198/770 |
| 5,730,297 A * | 3/1998 | Lower et al. | 209/332 |
| 6,047,811 A * | 4/2000 | Zittel et al. | 198/763 |
| 6,202,832 B1 * | 3/2001 | Evansic | 198/769 |
| 6,536,750 B1 * | 3/2003 | Martin | 267/136 |
| 6,705,459 B1 * | 3/2004 | Musschoot | 198/763 |
| 6,745,893 B2 * | 6/2004 | Von Wedel | 198/763 |
| 2001/0017275 A1 | 8/2001 | Kreft et al. | |
| 2001/0040119 A1 * | 11/2001 | Kreft | 209/405 |
| 2006/0032206 A1 * | 2/2006 | Hosking | 56/340.1 |
| 2007/0125624 A1 * | 6/2007 | Massman | 198/752.1 |
| 2009/0112045 A1 * | 4/2009 | Mathis et al. | 588/321 |

FOREIGN PATENT DOCUMENTS

| | | |
|---|---|---|
| DE | 10003172 C1 | 6/2001 |
| EP | 0775532 A1 | 5/1997 |
| GB | 1140245 A | 1/1969 |

OTHER PUBLICATIONS

Written Opinion of the International Searching Authority for International Application No. PCT/EP2013/066084, dated Nov. 26, 2013.
Search Report issued by the German Patent and Trademark Office for German Patent Application No. DE 102012214341.6, dated Dec. 10, 2012.

* cited by examiner

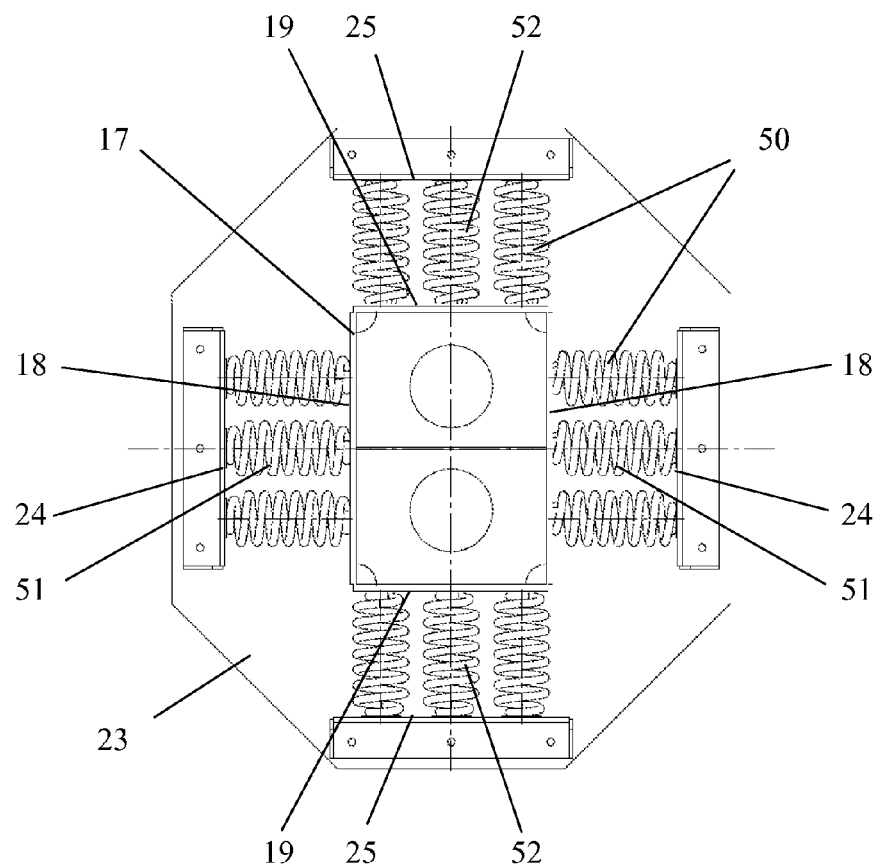
FIG. 3
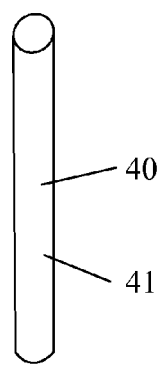
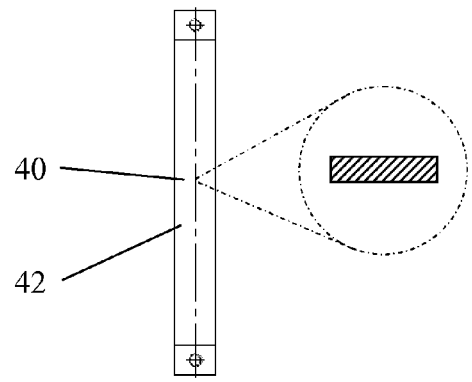
FIG. 4   FIG. 5

TREATMENT DEVICE FOR FREE-FLOWING BULK MATERIAL

CROSS-REFERENCE TO RELATED APPLICATION

This application claims the priority, under 35 U.S.C. §119, of German Patent Application No. DE 10 2012 214 341.6, filed Aug. 10, 2012; the prior application is herewith incorporated by reference in its entirety.

BACKGROUND OF THE INVENTION

Field of the Invention

The invention relates to a treatment device for free-flowing bulk material including a bulk material carrier with an inclined treatment area, a counter-vibration mechanism which extends longitudinally under the bulk material carrier and runs horizontally, supports for supporting the bulk material carrier in the vertical direction on the counter-vibration frame, a cable suspension for suspending the counter-vibration mechanism on a supporting structure, and a vibration exciter for exciting the treatment area in the longitudinal and transverse direction of the counter-vibration mechanism.

Such treatment facilities are suitable, for example, for an effective screening of sensitive bulk materials in various grain-size fractions, but can also be used for other treatment tasks where the bulk material, due to gravity and supported by a vibration excitation, is transported across the inclined treatment area.

A treatment device of the type mentioned above in the form of a screening machine is for example described in European Patent Application No. EP 0 775 532 A1 as prior art. In the known screening machine, a drive motor is attached to the base frame for driving the bulk material carrier via a crank drive, such that the bulk material carrier is made to perform an essentially horizontal circular vibration motion at its head end at which also the feeding of bulk material occurs. The outlet-side end of the bulk material carrier is supported via slide plates on the base frame and is additionally connected to it by an articulated arm. The latter forces an elliptical vibration at the outlet-side end. Along the length of the bulk material carrier the vibration movement thus changes from the circular shape at the head end to a very flat ellipse at the outlet-side end. If necessary, also an almost linear vibration movement in the longitudinal direction can be achieved at the outlet-side end. This change of the vibration movement has a positive effect on the degree of separation of the screening.

In the case of the above-described screening machine there is however the problem that moving machine parts which require lubrication, such as the articulated arm and the crank drive, are next to or below the bulk material carrier, and can therefore cause a particularly in the food industry problematic contamination of the environment of the treatment area with lubricants.

In addition, the mounting and the gearing mechanism require a high constructional outlay and result in correspondingly high costs. Furthermore, the mounting of the bulk material carrier on the crank arm of the crank drive is not maintenance-friendly.

SUMMARY OF THE INVENTION

It is accordingly an object of the invention to provide a treatment device for free-flowing bulk material, which overcomes the above-mentioned disadvantages of the heretofore-known treatment devices of this general type and which reduces the constructional outlay of a treatment device of the aforementioned type as well as the risk of contamination of the bulk material with lubricant.

With the foregoing and other objects in view there is provided, in accordance with the invention, a treatment device for free-flowing bulk material, including:

a bulk material carrier with an inclined treatment area;

a counter-vibration mechanism extending longitudinally under the bulk material carrier and running horizontally or in an inclined manner;

a cable suspension configured for suspending the counter-vibration mechanism on a supporting structure;

supports for supporting the bulk material carrier in a vertical direction on the counter-vibration mechanism;

a vibration exciter for an excitation of the inclined treatment area in a longitudinal direction and a transverse direction of the counter-vibration mechanism;

a spring assembly having several springs; and the bulk material carrier and the counter-vibration mechanism being connected by the spring assembly, the spring assembly providing an elastic coupling both in the longitudinal direction and in the transverse direction of the counter-vibration mechanism.

In other words, according to the invention there is provided a treatment device for free-flowing bulk material, including a bulk material carrier with an inclined treatment area, a counter-vibration mechanism, which extends longitudinally under the bulk material carrier and runs horizontally or likewise in an inclined manner, a cable suspension for suspending the counter-vibration mechanism on a supporting structure, supports for supporting the bulk material carrier in the vertical direction on the counter-vibration frame, a vibration exciter for the excitation of the treatment area in the longitudinal and transverse direction of the counter-vibration mechanism, wherein the bulk material carrier and the counter-vibration mechanism are connected by a spring assembly which has several springs and provides an elastic coupling both in the longitudinal direction and in the transverse direction of the counter-vibration mechanism.

Thus a ball bearing mounted articulated arm at the outlet-side end as well as a crank drive at the head end can be avoided. A considerable cost saving potential arises as a result of the simpler construction. Nevertheless, at the treatment area a similar vibration characteristic can be achieved in which a circular vibration at the head end becomes increasingly elliptical or even linear in the direction of the outlet-side end.

Moreover, the risk of a contamination of the environment of the bulk material carrier with lubricants is reduced.

Depending on the adjustment, among other things via the supports, other vibration behaviors along the transport path from the head end to the outlet-side end can also be implemented.

According to another feature of the invention, all or at least some of the supports are embodied as flexurally soft rods with a round cross-section.

According to yet another feature of the invention, the bulk material carrier has a head end for feeding bulk material and has an outlet-side end for discharging bulk material; and at least those of the supports that are closest to the outlet-side end are flexurally softer in the longitudinal direction of the counter-vibration mechanism than in the transverse direction of the counter-vibration mechanism.

According to a further feature of the invention, the vibration exciter is embodied as an unbalance motor and is coupled to the counter-vibration mechanism; and the unbalance motor has a rotation axis perpendicular to the longitudinal direction and the transverse direction of the counter-vibration mechanism.

According to another feature of the invention, the springs of the spring assembly are coil springs with respective horizontal lines of action.

According to another feature of the invention, the spring assembly has a first set of springs whose lines of action run in the longitudinal direction of the counter-vibration mechanism, and a second set of springs whose lines of action run in the transverse direction of the counter-vibration mechanism.

According to a further feature of the invention, the springs of the spring assembly are disposed in a star-shaped manner.

According to another feature of the invention, the treatment area is embodied as a screen.

Thus at least some of the supports can for example be embodied as flexurally soft rods with a round cross section. These allow large deflections of the bulk material carrier both in the transverse direction and in the longitudinal direction and thus favor correspondingly large amplitudes of circular and/or elliptical vibration movements of the treatment area. Maximum amplitudes are in the order of 25 to 50 millimeters. In particular, these supports can be equally flexurally soft in the transverse direction and the longitudinal direction.

According to a further advantageous embodiment, at least the supports closest to the outlet-side end are flexurally softer in the longitudinal direction of the counter-vibration mechanism than in the transverse direction thereof. Thus a vibration ellipse with a defined eccentricity can be enforced at the outlet-side end. Such supports can be implemented in a particularly simple manner as leaf springs, which are flexurally soft in the longitudinal direction, however, in the transverse direction, have a significantly greater stiffness.

In a further advantageous embodiment, the vibration exciter is configured as an unbalance motor and is coupled to the counter-vibration mechanism. Here, the unbalance motor has a rotation axis perpendicular to the longitudinal and transverse direction of the counter-vibration mechanism.

The unbalance motor can be coupled as a sealed structural unit solely to the counter-vibration mechanism and has no mechanical connection elements to the bulk material carrier or to other components. In this way, the risk of a contamination of the environment of the bulk material carrier with lubricants is further reduced.

Alternatively it is possible to couple such a vibration exciter only to the bulk material carrier, wherein also in this case no mechanical connection elements at all are provided to further components.

According to a further advantageous embodiment of the invention, the springs of the spring assembly are coil springs with a horizontal line of action. This allows a particularly stable, clean and maintenance-free coupling.

The spring assembly can for example have a first set of springs, whose lines of action run in the transverse direction of the counter-vibration mechanism, and a second set of springs, whose lines of action run in the longitudinal direction of the counter-vibration mechanism. This allows an easy assembly.

However, a different arrangement of the springs is also possible, as long as their entirety allows a coupling or, respectively, a connection both in the transverse direction as well as in the longitudinal direction. For example, it is also possible to arrange the springs of the spring assembly in a star-shaped manner.

As stated above, the treatment device can be operated as a screening machine, wherein the treatment area is then configured as a screen. However, the treatment device can also be used for other treatment tasks which are not necessarily associated with a screening.

Other features which are considered as characteristic for the invention are set forth in the appended claims.

Although the invention is illustrated and described herein as embodied in a treatment device for free-flowing bulk material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a diagrammatic plan view of the spring assembly according to the invention;

FIG. 4 is a perspective detail view of a support with a round cross section in accordance with the invention;

FIG. 5 is a detail view of a support embodied as a leaf spring in accordance with the invention.

DESCRIPTION OF THE PREFERRED EMBODIMENTS

Figure 1:
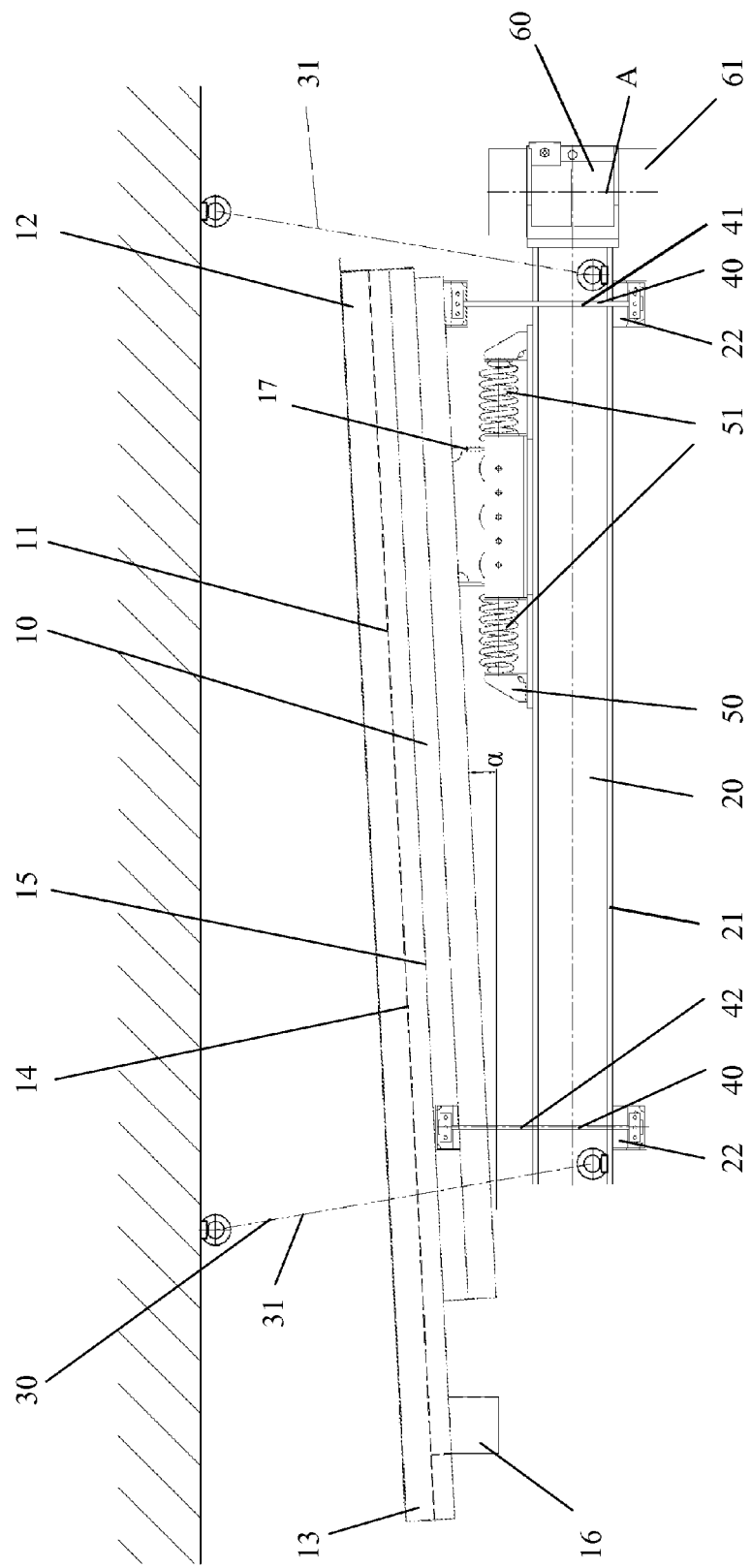
FIG. 1 is a diagrammatic side elevational view of an embodiment of a treatment device according to the invention.
Figure 2:
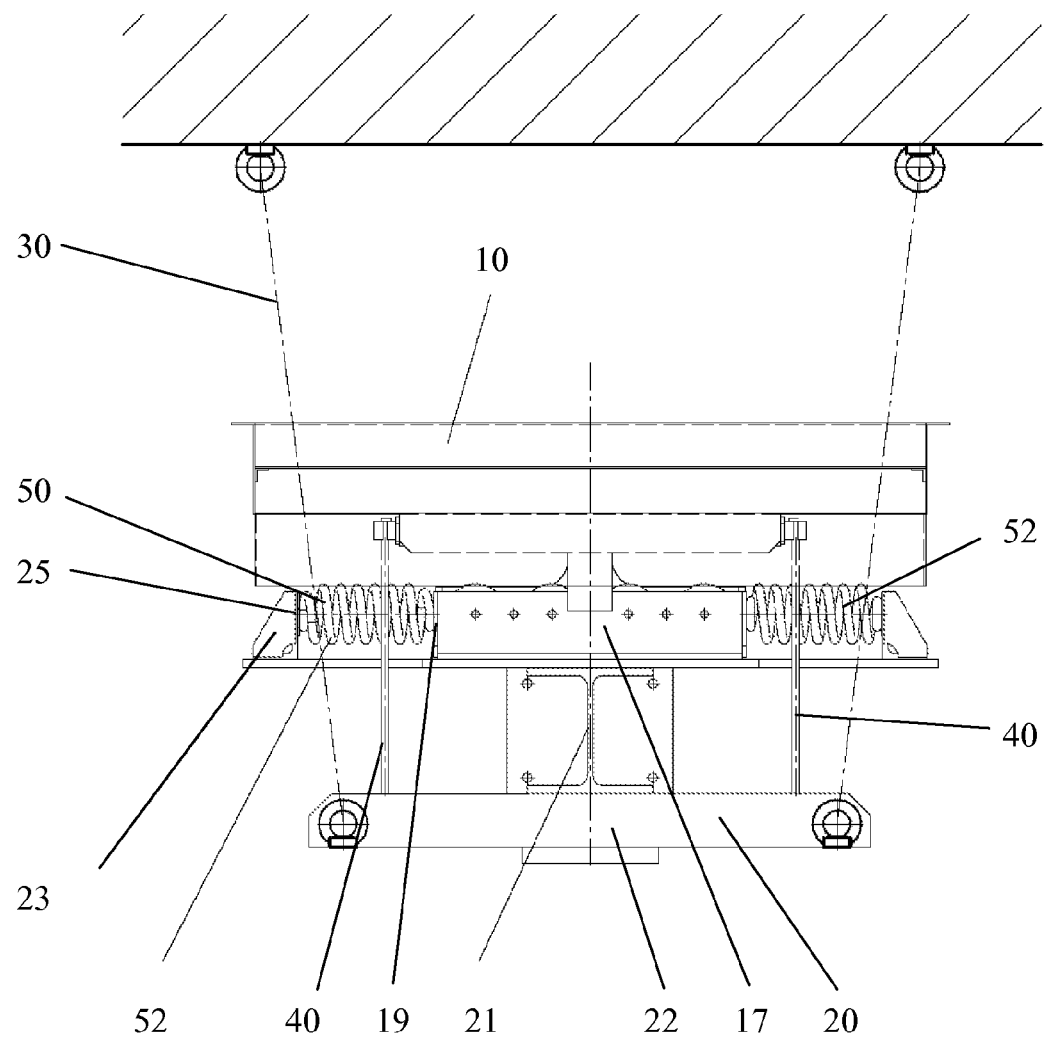
FIG. 2 is a diagrammatic elevational view toward the outlet-side front end of the treatment device according to FIG. 1.

The embodiment illustrated in FIGS. 1 to 5 shows a treatment device for free-flowing bulk material using the example of a screening machine. It is especially suitable for the screening of sensitive screening materials into different grain-size fractions, in particular for the separation of powdery and granular particles from a mass flow consisting predominantly of granulates or agglomerates.

The treatment device can however also be employed for other treatment tasks which require a vibration excitation of the bulk material, which is to be conveyed, in an essentially horizontal or slightly inclined treatment plane.

The treatment device includes a bulk material carrier 10 with a treatment area 11 which, if the transport of the bulk material is to be primarily achieved by the force of gravity, is at least slightly inclined with respect to a horizontal plane. For most free-flowing bulk materials suitable inclination angles α are in the order of 0° to 20°, preferably from 1.0° to 10°.

The treatment area 11 extends in this case from a head end 12 of the preferably oblong bulk material carrier 10, at which the feeding of bulk material occurs, to an outlet-side end 13, at which the bulk material leaves the bulk material carrier 10 again after passing through the treatment area 11. In the case of screening machines, the bulk material carrier 10 is also referred to as a screening box.

In the illustrated exemplary embodiment, the treatment area 11 is embodied as a screen 14, so that at the outlet side two mass flows are delivered, namely, the screened fraction, which is guided via a pan 15 of the bulk material carrier 10, that runs below the screen 14, to an outlet 16, and the residual fraction, which in this case is discharged via the outlet-side front end.

A counter-vibration mechanism 20 extends longitudinally below the bulk material carrier 10. The counter-vibration mechanism 20 runs horizontally in its longitudinal direction. It is suspended via a cable suspension 30 on a supporting structure. The supporting structure can for example be a frame construction, which is installed at the installation location of the treatment device. But it can also be a part of a building. In the present case a cable suspension 30 with four cables 31 is shown, wherein the cables 31 are coupled to end sections of the counter-vibration mechanism 20 that are spaced apart from one another in the longitudinal direction. However, a larger number of cables can also be provided in particular in the case of longer treatment devices. Via the cable suspension 30 a very good decoupling between the treatment device and the supporting structure is achieved. In particular a transmission of reaction forces in the longitudinal direction and the horizontal transverse direction of the counter-vibration mechanism 20 is avoided. The dynamic vertical forces, however, are small, because the vibration excitation takes place in a horizontal plane defined by the longitudinal and transverse direction of the counter-vibration mechanism 20.

In a modification of the exemplary embodiment, the counter-vibration mechanism 20 can be somewhat inclined with respect to the horizontal such that its longitudinal direction then does not run horizontally. The longitudinal direction of the counter-vibration mechanism 20 can in particular have the same inclination as the treatment area 11.

In the illustrated exemplary embodiment, the counter-vibration mechanism 20 is formed by a solid double-T beam 21 at whose ends cross-braces 22 for connecting the cables 31 are attached. However, the counter-vibration mechanism 20 can also be embodied in other ways, for example in the form of a closed frame.

The bulk material carrier 10 is supported on the counter-vibration frame 20 in the vertical direction via supports 40 and, except via the springs 53 or, respectively, the sets of springs 51, 52, is otherwise not connected to the supporting structure. The supports 40 are embodied as flexurally soft rods or bars which extend in the vertical direction, so that the bulk material carrier 10 is mounted in a floating manner and can freely vibrate perpendicular to the vertical direction both in the longitudinal direction and in the transverse direction.

According to the invention, the transition from an initially circular to an elliptical vibration movement is in principle achieved with partial resonance vibration systems of similar frequency in the longitudinal and transverse direction with springs 53 or sets of springs 51, 52 as well as a positioning of the transverse vibration system in the first third of the bulk material carrier.

At least some of the supports 40 are embodied as flexurally soft rods 41 with a round cross section, as is illustrated in FIG. 4. These are equally flexible in the longitudinal and transverse direction and allow at the treatment area 11 maximum movement amplitudes in the longitudinal direction and transverse direction of up to about 100 mm. This makes it possible to achieve the circular vibration movement which is impressed by the partial resonance vibration systems in the longitudinal and transverse direction with springs 53 or sets of springs 51, 52 and their positioning in the first third of the bulk material carrier. If one restricts the elasticity of the supports 40 in a direction, then this is equivalent to a reduction of the maximum vibration amplitudes in the respective direction. In this way the shape of the ellipse at the outlet-side end 13 can be influenced in a targeted manner. If the elliptical vibration movement is to be implemented for example from an initially circular vibration movement to a flatter elliptical vibration movement, the supports 40 closest to the outlet-side end 13 can be made flexurally softer in one direction, for example in the longitudinal direction of the counter-vibration mechanism 20 than in the transverse direction thereof. FIG. 5 shows only in an exemplary manner correspondingly suitable supports 40 in the form of leaf springs 42 with a rectangular cross section.

Furthermore, the bulk material carrier 10 and the counter-vibration mechanism 20 are connected by a spring assembly 50 having several springs. The spring assembly 50 achieves an elastic support perpendicular to the vertical direction both in the longitudinal direction and in the transverse direction of the counter-vibration mechanism 20. A support in the vertical direction is not provided at this location.

The spring assembly 50 is disposed near the head end 12 between the bulk material carrier 10 and the counter-vibration mechanism 20. It is preferably disposed, in relation to the longitudinal extension of the bulk material carrier 10, below the half of the bulk material carrier 10 that includes the head end 12, preferably the third of the bulk material carrier 10 that includes the head end 12.

In the illustrated exemplary embodiment, the springs of the spring assembly 50 according to FIG. 3 are coil springs 51 and 52 with a horizontal line of action. These springs are divided into a first set of springs 51, whose lines of action run in the longitudinal direction of the counter-vibration mechanism 20, and a second set of springs 52, whose lines of action run in the transverse direction of the counter-vibration mechanism 20. At the bottom side of the bulk material carrier 10 there is a box-shaped projection 17 whose side walls 18 and 19, which point in the longitudinal and transverse direction, form support surfaces for the coil springs 51 and 52. A console 23 is provided, in particular attached or formed, at the counter-vibration mechanism 20 wherein the console 23 has corresponding support surfaces 24 and 25 for the coil springs 51 and 52. The coil springs 51 and 52 are thus in each case accommodated between a support surface 18 or, respectively, 19 of the bulk material carrier 10 and a support surface 24 or, respectively, 25 of the counter-vibration mechanism 20.

It is possible to deviate from the spatial arrangement of the springs illustrated in FIG. 3 as long as it is ensured that an elastic support of the bulk material carrier 10 on the counter-vibration mechanism 20 perpendicular to the vertical direction in both the longitudinal direction and in the transverse direction of the counter-vibration mechanism 20 is provided.

Figure 6:
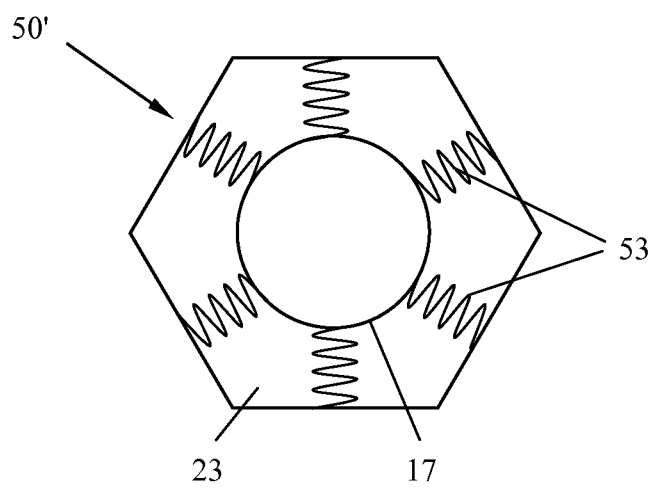
FIG. 6 is a schematic representation of an alternative spring assembly in accordance with the invention.

For example, it is possible, as illustrated in FIG. 6, to arrange the springs 53 of the spring assembly 50' in a star-shaped manner.

If the counter-vibration mechanism 20 is mounted slightly inclined, the elastic support or, respectively, coupling can be carried out in a plane, which is parallel to a plane defined by the inclined longitudinal direction and the horizontal transverse direction of the counter-vibration mechanism 20. Further, the elastic support or, respectively, coupling can also be effected in a plane parallel to the treatment area, in fact irrespective of whether the counter-vibration mechanism 20 is mounted horizontally or slightly inclined.

Lastly, the treatment device includes a vibration exciter 60 for the excitation of the treatment area 11 in the longitudinal and transverse direction of the counter-vibration mechanism 20.

In the illustrated exemplary embodiment, the vibration exciter 60 is embodied as an unbalance motor 61 and is coupled to the counter-vibration mechanism 20. The coupling can in this case be effected on the side of the head end 12, as is illustrated in FIG. 1. However, a space-saving coupling is also possible at the opposite end of the counter-vibration mechanism 20. In principle, however, the vibration exciter 60 can be connected at any point at the counter-vibration mechanism 20. In this case however there arises no circular vibration at the inlet-side end.

In all cases, the vibration exciter 60 has a rotation axis A which is perpendicular to the longitudinal and transverse direction of the counter-vibration mechanism 20 and around which an unbalance rotates. The vibration exciter 60 or, respectively, unbalance motor 61 is solely and exclusively coupled to the counter-vibration mechanism 20 and has no mechanical connection elements whatsoever to the bulk material carrier 10 and to other components of the treatment device and of the supporting structure. The vibration exciter 60 or, respectively, unbalance motor 61 can thus be provided as a sealed structural unit, so as to counter the risk of a contamination of the environment of the bulk material carrier with lubricants.

In accordance with a modification of the illustrated exemplary embodiment, it is also possible to couple such a vibration exciter 60 or, respectively, sealed unbalance motor 61 only to the bulk material carrier 10 wherein in this case no mechanical connection elements to other components are provided at all.

Furthermore it is possible to dispose the vibration exciter 60 in such a way that its rotation axis A is perpendicular to the treatment area. If the counter-vibration mechanism 20 is inclined, the rotation axis A of the vibration exciter 60 can be aligned with the vertical or alternatively perpendicular to the plane defined by the longitudinal and transverse axis of the counter-vibration mechanism 20.

The above-described treatment device forms a two-mass vibration system wherein the bulk material carrier 10 and the counter-vibration mechanism 20 are attuned to one another with the help of the spring assembly 50 such that both in the longitudinal direction and in the transverse direction of the counter-vibration mechanism partial resonance systems arise whose natural frequencies are the same or are at least approximately the same. In the case of the rotation of the vibration exciter 60 or, respectively, of the unbalance motor 61 close to these natural frequencies, the treatment device can be excited to vibrate such that along the length of the treatment area 11 the vibration movement changes from a circular shape to a very flat ellipse lying in the longitudinal direction, if applicable also to a purely linear reciprocating movement. A high degree of separation of the screening at a screening machine is for example hereby achieved.

By avoiding open rotating mechanical elements such as bearings, joints and gearing mechanisms, the risk of a contamination of the environment of the bulk material or of the bulk material itself with lubricant is reduced.

In addition, this results in a comparatively simple and thus cost-effective setup for which furthermore all relevant components are easily accessible for maintenance purposes.

The invention has been described in detail with reference to an exemplary embodiment as well as further modifications. However, it is not limited thereto but comprises all embodiments defined by the claims. In particular, described technical features can even then be combined with one another when this is not explicitly described, as long as this is technically possible.

What is claimed is:

1. A treatment device for free-flowing bulk material, comprising:
   a bulk material carrier with an inclined treatment area;
   a counter-vibration mechanism extending longitudinally under said bulk material carrier and running horizontally or in an inclined manner;
   a cable suspension configured for suspending said counter-vibration mechanism on a supporting structure;
   supports for supporting said bulk material carrier in a vertical direction on said counter-vibration mechanism;
   a vibration exciter configured and arranged to provide an excitation of said inclined treatment area in a longitudinal direction and a transverse direction of said counter-vibration mechanism;
   a spring assembly having several coil springs, each of said coil springs having a respective line of action extending horizontally or in a inclined manner; and
   said bulk material carrier and said counter-vibration mechanism being connected by said spring assembly, said spring assembly providing an elastic coupling via said coil springs both in the longitudinal direction and in the transverse direction of said counter-vibration mechanism.

2. The treatment device according to claim 1, wherein at least some of said supports are embodied as flexurally soft rods with a round cross-section.

3. The treatment device according to claim 1, wherein:
   said bulk material carrier has a head end for feeding bulk material and has an outlet-side end for discharging bulk material; and
   at least those of said supports that are closest to said outlet-side end are flexurally softer in the longitudinal direction of said counter-vibration mechanism than in the transverse direction of said counter-vibration mechanism.

4. The treatment device according to claim 1, wherein:
   said vibration exciter is embodied as an unbalance motor and is coupled to said counter-vibration mechanism; and
   said unbalance motor has a rotation axis perpendicular to the longitudinal direction and the transverse direction of said counter-vibration mechanism.

5. The treatment device according to claim 1, wherein said coil springs have respective horizontal lines of action.

6. The treatment device according to claim 1, wherein said coil springs include a first set of coil springs whose lines of action run in the longitudinal direction of said counter-vibration mechanism, and a second set of coil springs whose lines of action run in the transverse direction of said counter-vibration mechanism.

7. The treatment device according to claim 1, wherein said coil springs of said spring assembly are disposed in a star-shaped manner.

8. The treatment device according to claim 1, wherein said treatment area is embodied as a screen.

9. The treatment device according to claim 1, wherein said vibration exciter provides a vibration excitation in a horizontal plane defined by the longitudinal direction and the transverse direction of said counter-vibration mechanism.

10. The treatment device according to claim 1, wherein said vibration exciter is solely coupled to said counter-vibration mechanism.

11. The treatment device according to claim 10, wherein said vibration exciter forms a sealed structural unit.

* * * * *